United States Patent [19]

Kobayashi

[11] 4,196,871
[45] Apr. 8, 1980

[54] LINE TENSION RESPONSIVE ANTI-BACKLASH BRAKE DEVICE FOR FISHING REEL

[75] Inventor: Takehiro Kobayashi, Fukuyama, Japan

[73] Assignee: Ryobi, Ltd., Fuchu, Japan

[21] Appl. No.: 959,279

[22] Filed: Nov. 9, 1978

Related U.S. Application Data

[63] Continuation-in-part of Ser. No. 768,819, Feb. 15, 1977, abandoned.

[30] Foreign Application Priority Data

Feb. 17, 1976 [JP] Japan ............................. 51-17932[U]

[51] Int. Cl.² ............................................. A01K 89/02
[52] U.S. Cl. ............................................. 242/84.52 A
[58] Field of Search ................... 242/84.52 A, 84.52 R

[56] References Cited

U.S. PATENT DOCUMENTS

| 1,609,684 | 12/1926 | Bellon | 242/84.52 A |
| 2,374,551 | 4/1945 | Margis, Jr. | 242/84.52 A |
| 4,093,144 | 6/1978 | Morishita | 242/84.52 A |

FOREIGN PATENT DOCUMENTS 447510  5/1936  United Kingdom ............. 242/84.52 A

*Primary Examiner*—Billy S. Taylor
*Attorney, Agent, or Firm*—Sughrue, Rothwell, Mion, Zinn and Macpeak

[57] ABSTRACT

An L-shaped brake control lever 8 is pivotally disposed on a side frame spacing post 4' coaxial with a sleeve 5 on which the supporting arms 7 for a line tension sensing roller 6 are pivotally mounted, one arm 8' of the lever being coupled to a roller arm 7 for pivotal movement therewith. The other lever arm 8" is adjustably spring biased and is coupled to the free end of a pivotally mounted brake lever bearing a frictional brake shoe disposed adjacent the inner surface of a reel spool flange. When the unwinding fishing line is under tension, it lifts the roller 6 which, through the lever and arm linkage coupled thereto, releases the spool brake against the force of the biasing spring. When the line tension is reduced, however, the spool brake is automatically re-engaged to thereby prevent backlashing.

6 Claims, 5 Drawing Figures

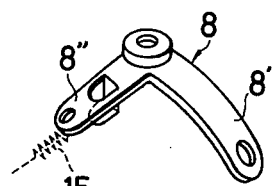
FIG. 3
FIG. 2
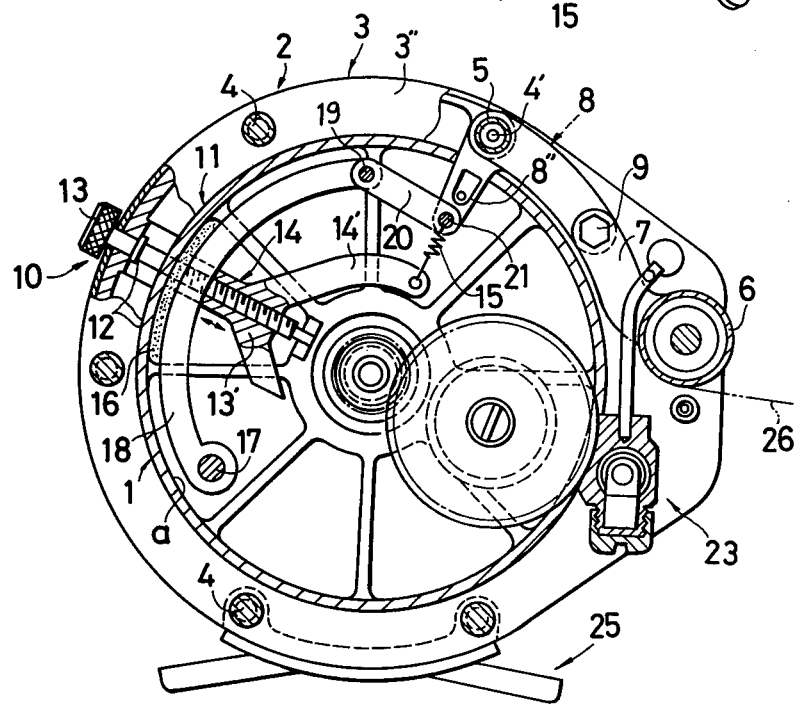
FIG. 4
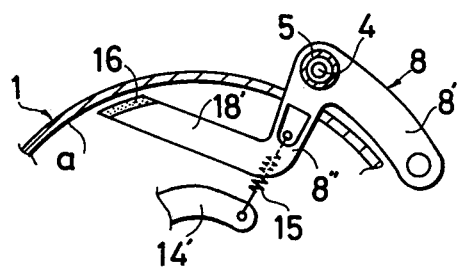

LINE TENSION RESPONSIVE ANTI-BACKLASH BRAKE DEVICE FOR FISHING REEL

This application is a continuation-in-part application of my co-pending application Ser. No. 768,819 filed Feb. 15, 1977, now abandoned.

BACKGROUND OF THE INVENTION

This invention relates to an anti-backlash brake device for a two-bearing support type of fishing reel, wherein the brake device is responsive to the tension of the line being paid out.

In general, fishing line release or unwinding is accomplished by pulling the line out directly by hand, or by the weight of a sinker, lure or bait and the weight of the line after the clutch has been disengaged. When the line release speed is abruptly decreased, as when a heavy sinker strikes the bottom, the inertial rotation speed of the spool may remain higher than the line release speed, whereby a backlash occurs. Heretofore, the unwinding of the line has been controlled by "thumbing" the spool or by operating a brake in such a manner that the rotation speed of the spool never exceeds the line unwinding speed. However, these conventional methods are difficult to precisely apply, especially for beginners, whereby the backlash problem has long been the bane of the fishing fraternity.

SUMMARY OF THE INVENTION

The drawbacks and disadvantages attendant with the prior art methods are effectively overcome by the present invention, according to which an L-shaped brake control lever is pivotally disposed on a side frame spacing post coaxial with a sleeve on which the supporting arms for a line tension sensing roller are pivotally mounted, one arm of the lever being coupled to a roller arm for pivotal movement therewith. The other lever arm is adjustably spring biased and is coupled to the free end of a pivotally mounted brake lever bearing a frictional brake shoe disposed adjacent the inner surface of a reel spool flange. When the unwinding fishing line is under tension, it lifts the roller which, through the lever and arm linkage coupled thereto, releases the spool brake against the force of the biasing spring. When the line tension is reduced, however, the spool brake is automatically re-engaged to thereby prevent backlashing.

BRIEF DESCRIPTION OF THE DRAWINGS

FIG. 2 shows a view, with essential parts sectioned, of the right-hand side of the reel shown in FIG. 1.

FIG. 3 shows a perspective view of a brake control lever of the reel.

FIG. 4 shows a side view of a modified brake control lever mechanism.

DETAILED DESCRIPTION OF THE PREFERRED EMBODIMENTS

Figure 1:
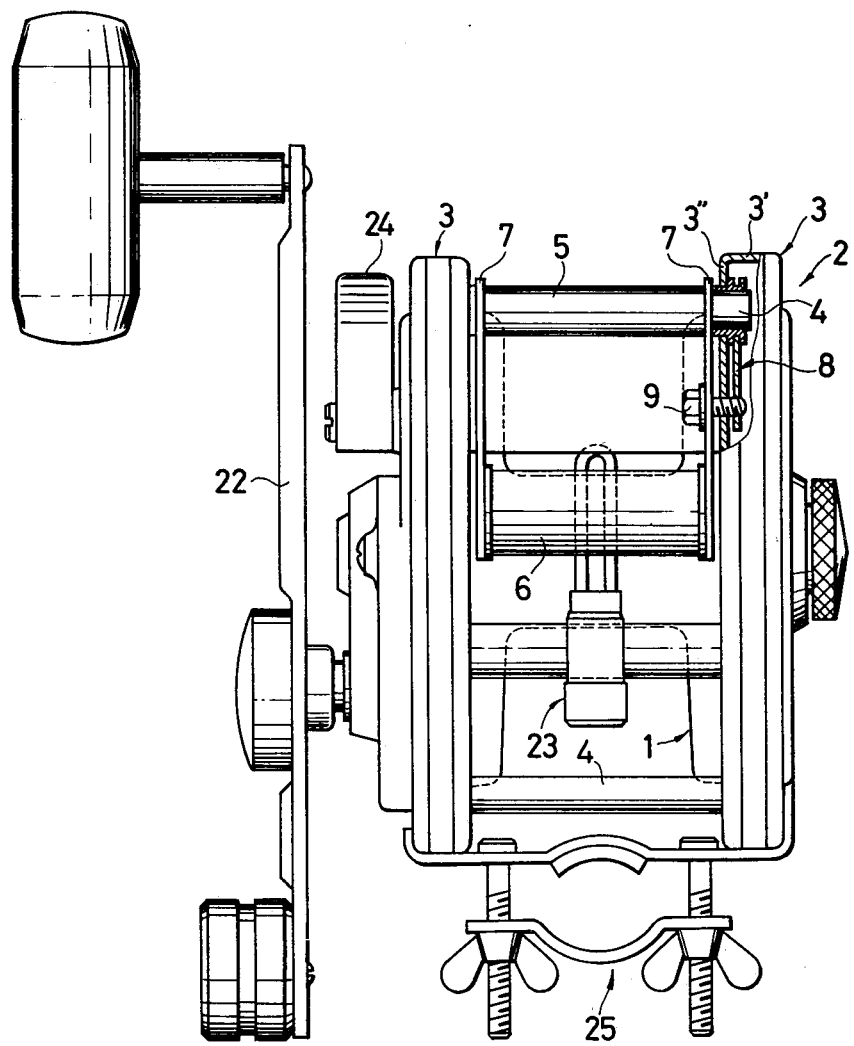
FIG. 1 shows a front view, partially cut away, of a fishing reel according to the present invention.

Referring now to the accompanying drawings, a reel body 2 mounts a spool 1 between two side frame plates 3 which are spaced a predetermined distance from each other by posts 4. A tubular sleeve 5 is fitted over one of the posts 4' between the two side frame plates, and two curved arms 7 have their one ends pivotally mounted on opposite ends of sleeve 5 in such a manner that the arms 7 can swing radially. A line laying roller 6 is supported between the other ends of the arms 7.

Each of the side frame plates 3 is hollow and comprises an outer, cup-shaped plate 3' and a flat inner plate 3" in the form of a lid covering the outer plate. The posts 4 penetrate into the inner plate 3" and are fixedly secured thereto. The base of an L-shaped brake control lever 8 is pivotally mounted on the outer end of the post 4'. One arm 8' of the control lever 8 is coupled to an arm 7 by a screw 9 so that the swinging motion of the arm 7 is transmitted to the control lever.

The other arm 8" of the control lever 8 is coupled to a brake control device 10 and a brake mechanism 11. More specifically, the brake control device 10 comprises a control fork 14 screwed onto a threaded portion 13' of an adjustment screw 13. The threaded portion 13' extends in a radial direction with respect to the spool. The adjustment screw 13 is rotatably supported by the outer plate 3', but its axial movement is prevented by the use of "E" ring 12. The control fork 14 has two branches or arms and is disposed between the inner plate 3" and the outer plate 3' of the side frame 3. The control fork can be radially moved without itself rotating by turning the adjustment screw 13. One arm 14' of the fork is operatively connected to the end of the control lever arm 8" by a spring 15.

The brake mechanism 11, as shown in FIG. 2, comprises a brake lever 18, and a connecting lever 20 whose ends are pivotally coupled to the free end of the brake lever 18 by a shaft 19 and to the end of the control lever arm 8" by a shaft 21. The brake lever 18 has substantially the same curvature as that of the spool flange, which serves as a brake drum surface a. A frictional brake shoe 16 is secured to the outer surface of the brake lever 18, and the lower end of the brake lever is pivotally mounted on a shaft 17 secured to the outer plate 3' of the side frame so that the brake lever can swing in a radial direction relative to the spool.

The brake mechanism 11 may be replaced by one which, as shown in FIG. 4, comprises a brake lever 18' bent from and integral with the control lever arm 8". The brake lever 18' extends towards the spool flange surface a, and a brake shoe 16 is secured to the end of the lever.

In FIG. 1, reference numeral 22 designates a handle, 23 is a double worm and pawl level wind mechanism, 24 is a clutch control lever, and 25 is a rod mounting clamp. In FIG. 2, reference numeral 26 designates a line wound on the spool.

In operation, the clutch is disengaged by operating the control lever 24 to thereby release the spool to unwind or pay out the line. As the line is unwound, due to manual pulling or the weight of the sinker, lure, water drag, etc., the tension in the line 26, bearing against the underside of the roller 6, tends to lift or raise the roller and thereby pivot the arms 7 counterclockwise about the sleeve 5. As a result, the coupled brake control lever 8 is also pivoted counterclockwise, which in turn pivots the brake lever 18 or 18' away from the spool flange and toward the center of the spool. Thus, the brake shoe 16 is moved away from and out of engagement with the brake surface a to thereby release the brake. The elastic force of the spring 15, at the same time, serves to restrain the counterclockwise pivoting of the control lever 8 and prevent any excessive release or separation between the brake shoe and the brake drum surface.

When a sinker reaches the bottom, a cast lure begins its descent arc or hits the water, etc., the line tension against the roller 6 is abruptly reduced, whereby the force of the spring 15 and the weight of the roller 6 and arms 7 pivots the brake control lever 8 back in a clockwise direction. This in turn moves the brake shoe 16 into frictional contact with the rotating drum surface a to thereby brake or halt the spool and thus prevent a backlash. The degree or extent of brake application is, of course, directional controlled by and proportional to the tension of the line 26, as sensed by the roller 6, whereby a smooth and precisely controlled unwinding operation is implemented.

By turning the adjustment screw 13 in a desired direction, the control fork 14 is axially moved along the threaded portion 13' in a radial direction to thereby accurately set the tension in the spring 15 and control the magnitude of the braking force as a function of the sinker/lure weight, the line weight, the type of fishing being done, etc.

The brake mechanism 11 is so designed that a high braking force can be obtained by applying only a relatively small force to the brake control lever 8, whereby precise and sensitive braking control may be achieved according to delicate variations in the loaded spool mass, the line and sinker weight, etc., within a wide range. Since the majority of the operative components are accommodated within the side frame 3, the line can never become tangled around those components, and the service life of the reel is increased even in the face of adverse external conditions such as rain water and sea water exposure. Furthermore, the exposed spool width can be decreased, and the weight of the reel can be correspondingly reduced.

Figure 5:
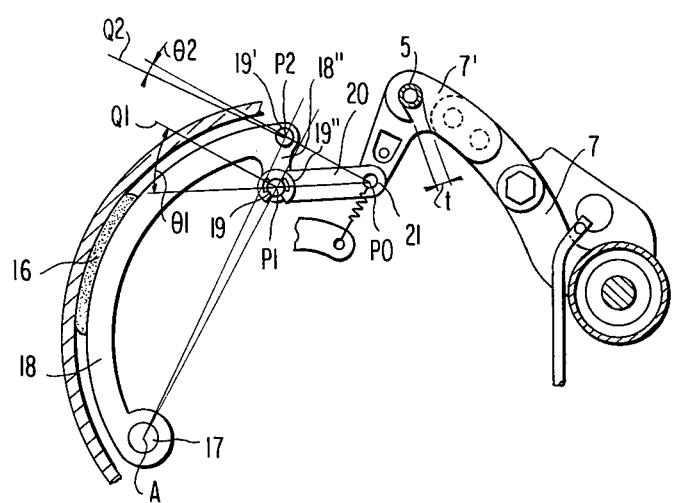
FIG. 5 shows a partial side view of a further embodiment of a brake device according to the present invention.

A further embodiment of a brake device according to the present invention will now be described with reference to FIG. 5. As shown in FIG. 5, a hooked member 7' having some degree of elasticity and made of a synthetic resin or metal is integrally formed at one end of arm 7. The hooked portion 7' fits over the tubular sleeve 5 and is provided with a slot having a width t which is less than the diameter of the post 4'. With this construction, the arm 7 can be readily detached from or attached to the post 4' so that the braking device can easily be converted from an anti-backlash brake to a conventional brake without an anti-backlash feature.

A further difference between the embodiment shown in FIG. 5 and that shown in FIG. 2 is that the brake lever 18 is provided with a hooked portion 18' including thereon at least two pins 19 and 19'. The distances between the shaft 17 and the shafts 19 and 19' are different, whereas the distances between the shaft 21 and the shafts 19 and 19' are equal. 19'' indicates a fastener which may be any one of a variety of fasteners well known in the art for holding the member 20 onto the pin 19.

With the construction shown in FIG. 5, it is possible to apply a wide range of braking force to the brake mechanism 11 since there is a significant difference in distances from the shaft 17 to the shafts 19 and 19', and also a significant difference in the pressing angle, to be described hereinbelow, when either of the two shafts are used. With the limited force supplied by the line tension and other members, it is possible to widen the range of the applied brake force. This is especially useful if the brake shoe 16 is considerably abraided or worn, in which case the braking effect can be maintained at a satisfactory level by merely connecting the lever 20 to the shaft 19'.

The significance of the pressing angle mentioned above will now be explained. When the connecting lever 20 is connected to the shaft 19, the pressing angle $\phi_1$ is defined by the line $P_0P_1$, which extends through the centers of shafts 21 and 19, and also by the line $P_1Q_1$, which is perpendicular to the line $AP_1$ passing through the center of shafts 17 and 19. In contrast, when the connecting lever 20 is connected to the shaft 19', the pressing angle $\phi_2$ is defined by the line $P_0P_2$ and the line $P_2Q_2$ which is perpendicular to the line $AP_2$. Moving the connection of the member 20 from pin 19 to pin 19' results in an increase in the distance from shaft 17 to the connecting pin and also results in a decrease of the pressing angle. This results in a corresponding increase in the braking force applied by the shoe 16.

Thus, as is apparent from the above description, the embodiment shown in FIG. 5 provides both the capability of adjusting the braking force to compensate for a worn braking device and the capability of disabling the anti-backlash feature of the brake.

What is claimed is:

1. In a fishing reel including a pair of spaced side plates (3), a plurality of posts (4) mounted betwen the side plates, an end flanged line spool (1) rotationally mounted in and between the side plates, and handle means (22) for rotating the spool, an automatic anti-backlash spool braking mechanism, characterized by:
    (a) a line engaging roller (6) pivotally mounted by a pair of spaced arms (7) to one of the posts for radial movement thereabout toward and away from the spool;
    (b) a brake control lever (7') pivotally mounted proximate its mid-portion to said one post, one arm of the lever being coupled to one of the roller mounting arms for movement therewith;
    (c) a brake lever (18) pivotally mounted proximate one end adjacent a spool flange and having a hooked portion (18'') having mounted thereon at least first and second pins;
    (d) a frictional brake shoe (16) secured to the brake lever and disposed adjacent the inner surface of the spool flange;
    (e) a connecting lever pivotally secured to one end of the other arm of said brake control lever and pivotally secured at its other end to one of said first and second pins; and
    (f) adjustable spring biasing means (10, 15) coupled to said other arm of the brake control lever, whereby the roller is radially moved in response to the tension of the unwinding line, and, via the spaced arms, brake control lever, and coupling means, automatically controls the engagement and disengagement of the brake shoe with the inner surface of the spool flange in accordance with such line tension, and whereby the braking force exerted by said brake shoe on the inner surface of said spool flange is adjustable by selectively connecting said other end of said connecting lever to either one of said first and second pins.

2. A fishing reel as defined in claim 1 wherein the brake control lever is L-shaped.

3. A fishing reel as defined in claim 1 wherein the distances between said one end of said brake lever and said first and second pins, respectively, are different.

4. A fishing reel as defined in claim 1 wherein the adjustable spring biasing means comprises a manually rotatable screw member (13), a spring mounting member (14) threadingly engaged with the screw member for axial movement thereon, and a spring (15) coupled between the mounting member and the other arm of the brake control lever.

5. A fishing reel as defined in claim 3 wherein the adjustable spring biasing means comprises a manually rotatable screw member (13), a spring mounting member (14) threadingly engaged with the screw member for axial movement thereon, and a spring (15) coupled between the mounting member and the other arm of the brake control lever.

6. A fishing reel as defined in claim 1 wherein each of said spaced arms is pivotally mounted to said one post by a resilient hook portion having an opening of width t smaller than the diameter of said one post so that each of said spaced arms may be easily removed from said post.

* * * * *